United States Patent
Shan et al.

(10) Patent No.: US 10,583,860 B2
(45) Date of Patent: Mar. 10, 2020

(54) STEERING ARM ASSEMBLY, STEERING MECHANISM AND MULTI-AXLE STEERING WHEEL TYPE HEAVY DUTY VEHICLE

(71) Applicant: XUZHOU HEAVY MACHINERY CO., LTD., Xuzhou, Jiangsu Province (CN)

(72) Inventors: Zenghai Shan, Xuzhou (CN); Honggang Ding, Xuzhou (CN); Yafu Zhu, Xuzhou (CN); Zhifang Wang, Xuzhou (CN); Yunwang Ma, Xuzhou (CN); Li Li, Xuzhou (CN)

(73) Assignee: Xuzhou Heavy Machinery Co., Ltd., Xuzhou (CN)

( * ) Notice: Subject to any disclaimer, the term of this patent is extended or adjusted under 35 U.S.C. 154(b) by 153 days.

(21) Appl. No.: 15/540,742

(22) PCT Filed: Oct. 21, 2015

(86) PCT No.: PCT/CN2015/092373
§ 371 (c)(1),
(2) Date: Jun. 29, 2017

(87) PCT Pub. No.: WO2016/107250
PCT Pub. Date: Jul. 7, 2016

(65) Prior Publication Data
US 2017/0341682 A1    Nov. 30, 2017

(30) Foreign Application Priority Data

Dec. 30, 2014 (CN) .......................... 2014 1 0841064

(51) Int. Cl.
*B62D 7/20* (2006.01)
*B62D 7/16* (2006.01)
(Continued)

(52) U.S. Cl.
CPC ................. *B62D 7/20* (2013.01); *B62D 7/06* (2013.01); *B62D 7/14* (2013.01); *B62D 7/16* (2013.01);
(Continued)

(58) Field of Classification Search
CPC ... B62D 7/20; B62D 7/14; B62D 7/16; B62D 7/06; B62D 7/18; B62D 7/166;
(Continued)

(56) References Cited

U.S. PATENT DOCUMENTS 1,556,531 A * 10/1925 McMillin ............. B60G 21/007
280/124.106
2,095,566 A * 10/1937 Lundelius ................ B62D 7/00
280/93.507
(Continued)

FOREIGN PATENT DOCUMENTS

| CN | 201914314 | 8/2011 |
| CN | 202827727 | 3/2013 |

(Continued)

OTHER PUBLICATIONS

Extended European Search Report for corresponding application 15874935.8 dated Sep. 4, 2018, 12 pages.

*Primary Examiner* — Paul N Dickson
*Assistant Examiner* — Timothy Wilhelm
(74) *Attorney, Agent, or Firm* — Myers Bigel, P.A.

(57) ABSTRACT

A steering arm assembly includes a steering arm body, a first rotary connecting part and a second rotary connecting part. A first end and a second end of the steering arm body are fixedly connected with a first rocker arm and a second rocker arm, respectively. The first rotary connecting part and the second rotary connecting part are respectively connected with the first end and the second end of the steering arm body, and the steering arm body is configured to rotate (Continued)

relative to the first rotary connecting part and the second rotary connecting part. The steering arm body is able to be detachably located on a mounting bracket through the first rotary connecting part and the second rotary connecting part; and the first rotary connecting part and the second rotary connecting part respectively include a first shaft housing and a second shaft housing, which are engaged with a first mounting plate and a second mounting plate respectively.

10 Claims, 3 Drawing Sheets

(51) Int. Cl.
| | |
|---|---|
| *B62D 7/06* | (2006.01) |
| *B62D 7/14* | (2006.01) |
| *B62D 7/18* | (2006.01) |
| *B60G 3/20* | (2006.01) |
| *B60G 11/26* | (2006.01) |

(52) U.S. Cl.
CPC .............. *B62D 7/166* (2013.01); *B62D 7/18* (2013.01); *B60G 3/20* (2013.01); *B60G 11/26* (2013.01); *B60G 2200/142* (2013.01); *B60G 2200/44* (2013.01); *B60G 2202/314* (2013.01); *B60G 2206/50* (2013.01)

(58) Field of Classification Search
CPC . B62D 5/06; B62D 7/08; B62D 7/144; B60G 11/26; B60G 3/20; B60G 2200/44; B60G 2206/50; B60G 2202/314; B60G 2200/142; B60G 13/08; B60G 7/003; B60G 13/005; B60G 15/12; B60G 21/05; B60G 11/265; B60G 3/06; B60G 2204/416; B60G 2204/128; B60G 2300/06

See application file for complete search history.

(56) References Cited

U.S. PATENT DOCUMENTS

| | | | | |
|---|---|---|---|---|
| 2,852,289 A * | 9/1958 | Vanderburg | ............. | B62D 7/16 280/93.509 |
| 3,026,558 A * | 3/1962 | Mulholland | ........ | B60B 33/0042 16/35 R |
| 3,078,113 A * | 2/1963 | Carlson | .................... | B62D 7/16 280/93.508 |
| 3,369,848 A * | 2/1968 | Gerner | ..................... | B62D 7/16 280/93.508 |
| 3,434,763 A * | 3/1969 | Gerner | ..................... | F16C 11/04 280/93.508 |
| 3,441,288 A * | 4/1969 | Boughner | ................ | B62D 7/18 280/93.512 |
| 3,565,455 A * | 2/1971 | Kostas | ..................... | B60G 3/01 280/124.127 |
| 3,709,516 A * | 1/1973 | Ewert | ..................... | B60G 3/20 180/353 |
| 4,269,423 A * | 5/1981 | Perez | ...................... | B60B 11/06 188/106 F |
| 4,941,671 A * | 7/1990 | Ellingsen | ............... | B62D 7/144 180/24.01 |
| 5,097,702 A * | 3/1992 | Nantua | ................. | F16C 41/007 73/115.07 |
| 5,121,808 A * | 6/1992 | Visentini | ............... | B60B 35/003 180/435 |
| 5,785,395 A * | 7/1998 | Crabb | ..................... | B62D 55/14 180/9.54 |
| 5,820,150 A * | 10/1998 | Archer | ..................... | B60G 3/20 280/124.138 |
| 5,947,496 A * | 9/1999 | Kraft | ....................... | B62D 7/00 280/93.508 |
| 5,961,219 A * | 10/1999 | Maughan | .................. | F16F 1/38 384/220 |
| 6,131,689 A * | 10/2000 | Nodorft | ................. | B62D 7/142 180/234 |
| 6,257,078 B1 * | 7/2001 | Vencill | .................... | F16C 25/06 33/517 |
| 6,257,357 B1 * | 7/2001 | Teal | ........................ | B62D 7/10 180/6.2 |
| 6,325,396 B1 * | 12/2001 | Romig | ..................... | B60G 9/02 280/103 |
| 6,357,543 B1 * | 3/2002 | Karpik | ..................... | B60G 3/20 180/182 |
| 6,456,925 B1 * | 9/2002 | Romig | ............... | B60K 31/0075 701/110 |
| 6,904,985 B2 * | 6/2005 | Ferree | ..................... | B60K 17/10 180/6.32 |
| 6,905,380 B1 * | 6/2005 | Varga | ....................... | B63H 7/02 440/37 |
| 6,951,259 B2 * | 10/2005 | Irikura | ..................... | B62D 7/09 180/307 |
| 7,108,253 B2 * | 9/2006 | Venton-Walters | ........................ | B60G 13/003 267/140 |
| 7,918,305 B2 * | 4/2011 | Scherbring | ............ | A01D 34/64 180/408 |
| 7,992,659 B2 * | 8/2011 | Schaedler | ................ | B62D 7/08 180/6.2 |
| 8,020,648 B2 * | 9/2011 | Otto | ...................... | B60B 33/045 180/6.48 |
| 8,262,110 B2 * | 9/2012 | Zaloga | ..................... | B62D 7/08 280/86.75 |
| 8,353,377 B2 * | 1/2013 | Geiger | .................... | B60B 35/10 180/209 |
| 9,272,574 B2 * | 3/2016 | Ebert | .................. | B60B 27/0078 |
| 9,393,988 B2 * | 7/2016 | Murakami | ............... | B62D 3/00 |
| 9,586,617 B2 * | 3/2017 | Welin | ..................... | B62D 7/144 |
| 9,796,233 B2 * | 10/2017 | Ding | ........................ | B60G 3/06 |
| 9,914,326 B2 * | 3/2018 | White | .................. | B60B 27/0073 |
| 10,144,475 B2 * | 12/2018 | Matthies | ................... | B62K 5/10 |
| 2010/0201095 A1 * | 8/2010 | Stephenson | ............ | B60G 3/145 280/124.166 |
| 2014/0361505 A1 * | 12/2014 | Ormiston | ................ | B62D 7/18 280/93.512 |

FOREIGN PATENT DOCUMENTS

| | | |
|---|---|---|
| CN | 203126427 | 8/2013 |
| CN | 203186415 | 9/2013 |
| CN | 203864790 | 10/2014 |
| CN | 203864791 | 10/2014 |
| CN | 203902662 | 10/2014 |
| CN | 203902663 | 10/2014 |
| CN | 104512460 | 4/2015 |
| CN | 204399277 | 6/2015 |
| DE | 3144348 | 6/1983 |
| JP | 2011131801 | 7/2011 |
| WO | WO 2014/187085 | 11/2014 |

* cited by examiner

STEERING ARM ASSEMBLY, STEERING MECHANISM AND MULTI-AXLE STEERING WHEEL TYPE HEAVY DUTY VEHICLE

RELATED APPLICATIONS

The present application is a 35 U.S.C. § 371 national phase application of PCT International Application No. PCT/CN2015/092373, filed Oct. 21, 2015, which claims priority to Chinese Patent Application No. 201410841064.4 filed Dec. 30, 2014, the disclosures of which are hereby incorporated herein by reference in their entireties.

FIELD OF THE INVENTION

The present application relates to the field of engineering machinery, and in particular, to a steering arm assembly, a steering mechanism and a multi-axle steering wheel type heavy duty vehicle.

BACKGROUND OF THE INVENTION

With increasing requirements on riding comfort and off-road performance of vehicles, the independent suspension technology is gradually used in multi-axle wheel type heavy duty vehicles which have higher requirements on the off-road performance. FIG. 1 is an existing independent suspension device for a multi-axle steering wheel type heavy duty vehicle, an upper hinge point of a hydro-pneumatic suspension cylinder a1 is hinged and fixed with a bracket spherical hinge on a vehicle frame a5, and a lower hinge point is fixed with a steering knuckle a2 by a bolt; one end of a lower cross arm a3 and a lower end face a22 of the steering knuckle a2 are connected by a spherical hinge and are fixed by a bolt, and the other end of the lower cross arm is fixed with a trapezoidal arm a4.

For the independent suspension device as shown in FIG. 1, the existing technical problem is that a trapezoidal steering arm a4 is placed on an upper end face a21 or the lower end face a22 of the steering knuckle. Assuming that the trapezoidal steering arm is mounted on the upper end face a21 of the steering knuckle, H1 is the distance from the center of the upper end face a21 of the steering knuckle to a lower end face a6 of the vehicle frame. Due to the limit of a local section structure of the vehicle frame a5, if upward skipping travels of wheels on a single side are too large, a trapezoidal track rod a4 may interfere with the section of the vehicle frame or other parts and components attached to the vehicle frame, that is, this arrangement will influence the upward skipping travels of the wheels relative to the vehicle frame.

If the trapezoidal steering arm is mounted on the lower end face a22 of the steering knuckle, and H2 is the distance from the lower end face of the steering knuckle to the lower end face of the vehicle frame, since H2 is too high, the design of a transitional steering arm for transferring force and coordinating the movement of left and right steering wheels is a problem.

FIG. 2 shows a schematic diagram of an existing steering arm used in the independent suspension device in which the trapezoidal steering arm is mounted on the lower end face of the steering knuckle. The steering arm assembly is connected and fastened with the vehicle frame b6 or a bracket b6 welded on the vehicle frame through a rotatable pin shaft b5; the trapezoidal steering arm b1 is mounted on the lower end face of the steering knuckle; a steering link assembly b3 transfers movements and forces output from a steering wheel and a steering gear to a trapezoidal track rod b2 through the fan-shaped movement of the steering arm to drive the fan-shaped movement of the trapezoidal arm b1, so as to overcome a steering resistance moment from the ground and achieve the steering of a steering wheel. In order to improve the working stability of the entire steering mechanism including a steering arm device, for the steering arm b4 and the pin shaft b5 in FIG. 2, the second moment of area thereof needs to be improved to improve the bending resistance and the torsional deformation resistance thereof. In this way, the outside diameters of the steering arm b4 and the pin shaft b5 have to be increased, and then the weights are increased accordingly. If the bending strength and the torsional strength of the steering arm b4 and the pin shaft b5 are insufficient, large bending/torsional deformation, breakage, weld cracking and other problems will occur; and moreover, if a certain section of the pin shaft b5 is subjected to bending deformation or breakage, it is costly to grind the pin shaft residual on the vehicle frame bracket and find out a precise position to weld a new pin shaft, and thus the subsequent maintenance cost is increased.

SUMMARY OF INVENTION

The objective of the present application is to provide a steering arm assembly, a steering mechanism and a multi-axle steering wheel type heavy duty vehicle, in order to improve the bearing capacity of a steering arm, lower the repair and maintenance costs and improve the working stability of the steering mechanism and the multi-axle steering wheel type heavy duty vehicle.

To achieve the above objective, the present application provides a steering arm assembly, including a steering arm body, a first rotary connecting part and a second rotary connecting part, wherein a first end and a second end of the steering arm body are fixedly connected with a first rocker arm and a second rocker arm respectively;

the first rotary connecting part and the second rotary connecting part are respectively connected with the first end and the second end of the steering arm body, and the steering arm body is rotatable relative to the first rotary connecting part and the second rotary connecting part;

the steering arm body is detachably located on a mounting bracket through the first rotary connecting part and the second rotary connecting part; and the first rotary connecting part further includes a first shaft housing, and the second rotary connecting part further includes a second shaft housing; the mounting bracket includes a first mounting plate and a second mounting plate corresponding to the first shaft housing and the second shaft housing respectively; and the first shaft housing and the second shaft housing are respectively engaged with the first mounting plate and the second mounting plate to rotatably locate the steering arm body on the mounting bracket.

Further, the first rotary connecting part includes a first cylinder and a first bearing, and an inner ring of the first bearing is sleeved and fixed on the first cylinder; the second rotary connecting part includes a second cylinder and a second bearing, and an inner ring of the second bearing is sleeved and fixed on the second cylinder.

Further, the steering arm body comprises a sleeve, and a pin shaft whose length is larger than that of the sleeve is sleeved in the sleeve; a first end of the pin shaft forms the first cylinder, and a second end of the pin shaft forms the second cylinder; the inner ring of the first bearing is fixedly connected with the first end of the pin shaft, and an outer ring of the first bearing is fixedly connected with the inner wall of the first end of the sleeve; and the inner ring of the second bearing is fixedly connected with the second end of the pin shaft, and an outer ring of the second bearing is fixedly connected with the inner wall of the second end of the sleeve.

Further, a first step structure is formed on the first end of the sleeve; a second step structure is formed on the inner wall of the second end of the sleeve; the outer ring of the first bearing is located on the first step structure; and the outer ring of the second bearing is located on the second step structure.

Further, the steering arm assembly further includes a first bearing retainer ring and a second bearing retainer ring, and the first bearing retainer ring and the second bearing retainer ring are respectively located on the first end and the second end of the sleeve for closing the first bearing and the second bearing in the first end and the second end.

Further, the first bearing retainer ring is provided with a first boss structure, and when the first bearing retainer ring is located on the first end, the first boss structure abuts against the inner ring of the first bearing; and the second bearing retainer ring is provided with a second boss structure, and when the second bearing retainer ring is located on the second end, the second boss structure abuts against the inner ring of the second bearing.

Further, the steering arm assembly further includes a first round nut, a first check washer and a first sealing pad, wherein the first round nut locates the first bearing retainer ring on the first end of the sleeve through the first check washer, and the first sealing pad isolates the first bearing from the external environment; and the steering arm assembly further includes a second round nut, a second check washer and a second sealing pad, the second round nut locates the second bearing retainer ring on the second end of the sleeve through the second check washer, and the second sealing pad isolates the second bearing from the external environment.

To achieve the above objective, the present application further provides a steering mechanism, including the aforementioned steering arm assembly.

Further, the steering arm assembly comprises a first steering arm assembly and a second steering arm assembly, and the steering mechanism further comprises a first hydro-pneumatic suspension cylinder, a second hydro-pneumatic suspension cylinder, a first steering knuckle and a second steering knuckle;

wherein the first steering arm assembly and the second steering arm assembly are rotatably located on the mounting bracket;

an upper hinge point of the first hydro-pneumatic suspension cylinder is hinged with the mounting bracket, and a lower hinge point of the first hydro-pneumatic suspension cylinder is fixedly connected with the first steering knuckle; an upper hinge point of the second hydro-pneumatic suspension cylinder is hinged with the mounting bracket, and a lower hinge point of the second hydro-pneumatic suspension cylinder is fixedly connected with the second steering knuckle; and the first steering knuckle and the second steering knuckle are respectively connected with the first steering arm assembly and the second steering arm assembly.

Further, the first steering knuckle is provided with a first trapezoidal arm, and the second steering knuckle is provided with a second trapezoidal arm; the first trapezoidal arm is connected with a lower rocker arm of the first steering arm assembly through a first trapezoidal track rod; the second trapezoidal arm is connected with the lower rocker arm of the second steering arm assembly through a second trapezoidal track rod; and the lower rocker arm of the first steering arm assembly is connected with the lower rocker arm of the second steering arm assembly through an intermediate transition rod.

Further, an upper rocker arm of the first steering arm assembly is connected with a first steering link assembly; and the upper rocker arm of the second steering arm assembly is connected with a second steering link assembly.

To achieve the above objective, the present application further provides a multi-axle steering wheel type heavy duty vehicle, including the aforementioned steering mechanism.

According to the steering arm assembly of the present application, the rotary connecting parts are arranged on both ends of the steering arm and are detachably located on the bracket, the connecting strength of the steering arm is improved by connecting the both ends to the bracket on the one hand, and on the other hand, when the connecting parts are damaged, the influence on the bracket is avoided, the consumed cost is lowered, and the subsequent maintenance cost is reduced, therefore the use costs of the steering mechanism and the multi-axle steering wheel type heavy duty vehicle are reduced; and in addition, since the first mounting plate and the second mounting plate respectively engaged with the first shaft housing and the second shaft housing are arranged on the mounting bracket, the steering arm can be mounted on the mounting bracket more effortlessly, and compared with the manner of welding the steering arm on the bracket in the prior art, the structure of the present application is easier to assemble, which is conducive to improving the assembly efficiency, and the structure is firmer.

DETAILED DESCRIPTION OF THE EMBODIMENTS

The technical solutions of the present application will be further described below in detail through the accompanying drawings and embodiments.

Figure 1:
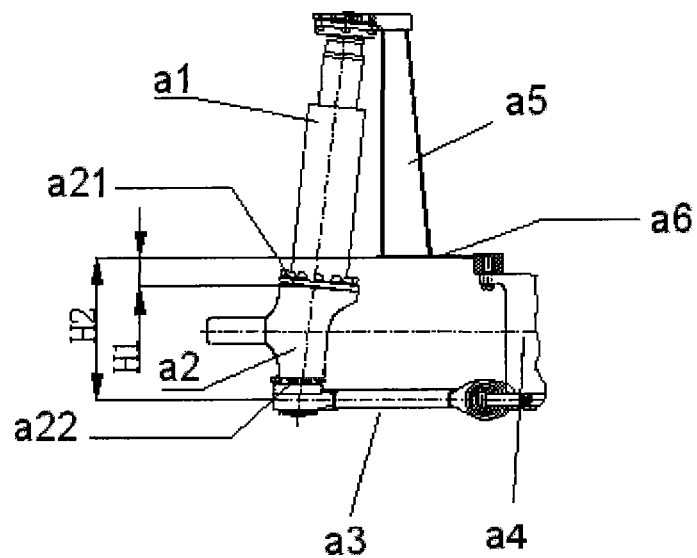
FIG. 1 is a schematic diagram of an existing independent suspension device used in a multi-axle steering wheel type heavy duty vehicle.
Figure 2:
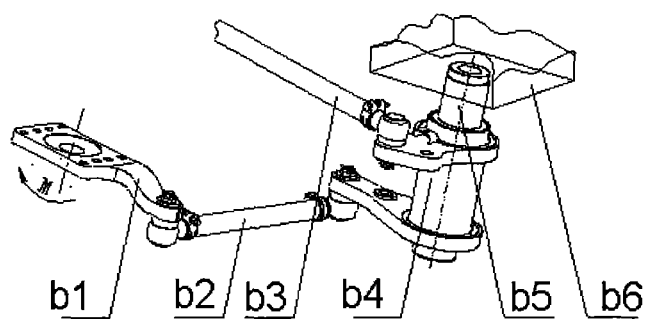
FIG. 2 is a schematic diagram of an existing steering arm used in an independent suspension device in which a trapezoidal steering arm is mounted on a lower end face of a steering knuckle.
Figure 3:
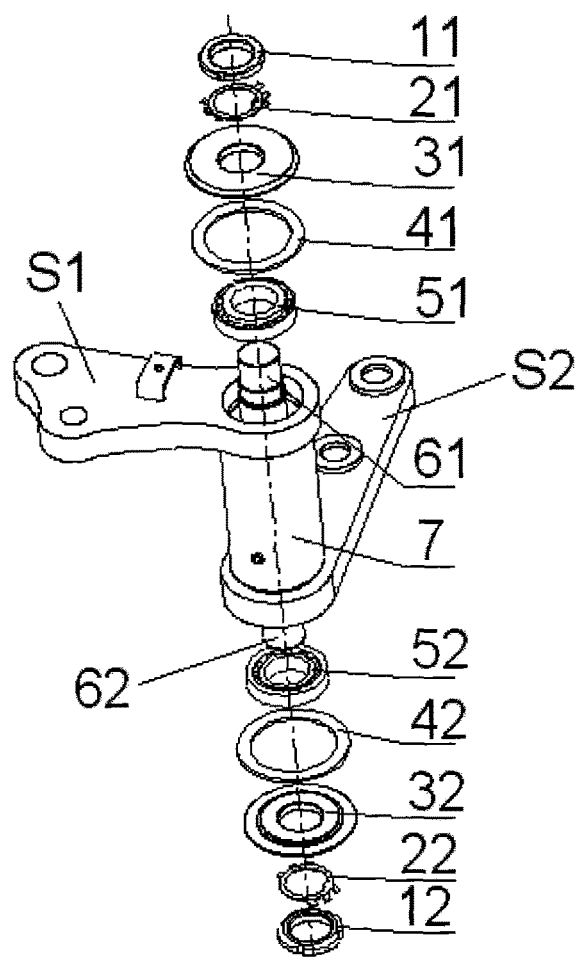
FIG. 3 is a schematic diagram of a specific embodiment of a steering arm assembly of the present application.
Figure 4:
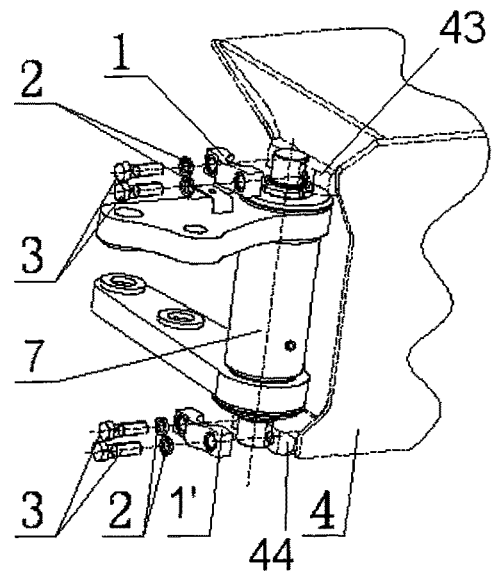
FIG. 4 is a schematic mounting diagram of a specific embodiment of a steering arm assembly of the present application.

FIG. 3 and FIG. 4 show an embodiment of a steering arm assembly of the present application. It includes a steering arm body 7, and a first end and a second end of the steering arm body 7 are fixedly connected with a first rocker arm S1 and a second rocker arm S2 respectively; it further includes a first rotary connecting part and a second rotary connecting part, wherein the first rotary connecting part and the second rotary connecting part are respectively connected with the first end and the second end of the steering arm body 7, and the steering arm body 7 is rotatable relative to the first rotary connecting part and the second rotary connecting part; and the steering arm body 7 are detachably located on a mounting bracket 4 through the first rotary connecting part and the second rotary connecting part. By means of the two-point detachable connection manner, the connecting strength of the steering arm is enhanced by connecting the both ends to the bracket on the one hand, and breakage, weld cracking and other problems during large bending/torsional deformation of the steering arm and the pin shaft are avoided; and on the other hand, if a certain section of the pin shaft in a traditional rocker arm device is subjected to bending deformation or breakage, the problem of high cost resulting from grinding the pin shaft residual on the vehicle frame bracket and finding out a precise position to weld a new pin shaft is avoided, the subsequent service and maintenance costs are reduced, when the connecting parts are damaged, the influence on the bracket is avoided, the consumed cost is lowered, and the subsequent maintenance cost is reduced, therefore the use costs of the steering mechanism and the heavy duty vehicle are reduced.

Specifically, as shown in FIG. 3, the first rotary connecting part further includes a first cylinder 61 and a first bearing 51, and an inner ring of the first bearing 51 is sleeved and fixed on the first cylinder 61; the second rotary connecting part includes a second cylinder 62 and a second bearing 52, and an inner ring of the second bearing 52 is sleeved and fixed on the second cylinder 62. Therefore a specific manner of achieving rotary connection is disclosed herein.

Specifically, the steering arm body 7 comprises a sleeve, and a pin shaft whose length is larger than that of the sleeve is sleeved in the sleeve; a first end of the pin shaft forms the first cylinder 61, and a second end of the pin shaft forms the second cylinder 62; the inner ring of the first bearing 51 is fixedly connected with the first end of the pin shaft, and an outer ring of the first bearing 51 is fixedly connected with the inner wall of the first end of the sleeve; and the inner ring of the second bearing 52 is fixedly connected with the second end of the pin shaft, and an outer ring of the second bearing 52 is fixedly connected with the inner wall of the second end of the sleeve.

In order to conveniently place the bearings, a first step structure is formed on a first end of the sleeve, and a second step structure is formed on the inner wall of a second end of the sleeve; the outer ring of the first bearing 51 is located on the first step structure, and the outer ring of the second bearing 52 is located on the second step structure.

To protect the bearings and prolong the service life, the steering arm assembly further includes a first bearing retainer ring 31 and a second bearing retainer ring 32, and the first bearing retainer ring 31 and the second bearing retainer ring 32 is respectively located on the first end and the second end of the sleeve for closing the first bearing 51 and the second bearing 52 in the first end and the second end.

In order to prevent the retainer rings from influencing the rotation of the bearings, the first bearing retainer ring 31 is provided with a first boss structure, and when the first bearing retainer ring 31 is located on the first end, the first boss structure abuts against the inner ring of the first bearing 51; and the second bearing retainer ring 32 is provided with a second boss structure, and when the second bearing retainer ring 32 is located on the second end, the second boss structure abuts against the inner ring of the second bearing 52.

Fixing and sealing structures on both ends of the steering arm will be introduced below. In the embodiment, the steering arm assembly further includes a first round nut 11, a first check washer 21 and a first sealing pad 41, the first round nut 11 is located the first bearing retainer ring 31 on the first end of the sleeve through the first check washer 21, and the first sealing pad 41 isolates the first bearing 51 from the external environment; and the steering arm assembly further includes a second round nut 12, a second check washer 22 and a second sealing pad 42, the second round nut 12 is located the second bearing retainer ring 32 on the second end of the sleeve through the second check washer 22, and the second sealing pad 42 isolates the second bearing 52 from the external environment, so as to prevent the entry of dust, sewage, etc.

Figure 5:
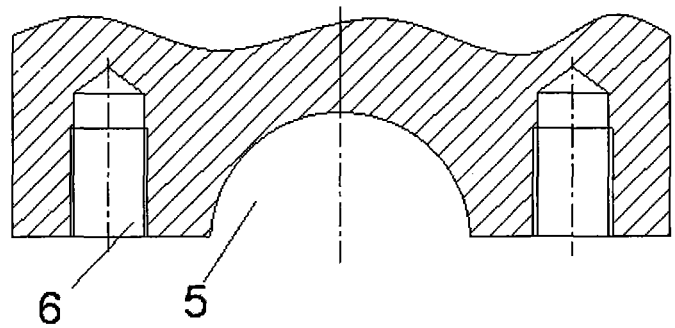
FIG. 5 is a schematic diagram of a specific embodiment of a mounting plate on a mounting bracket mounting a steering arm assembly of the present application.
Figure 6:
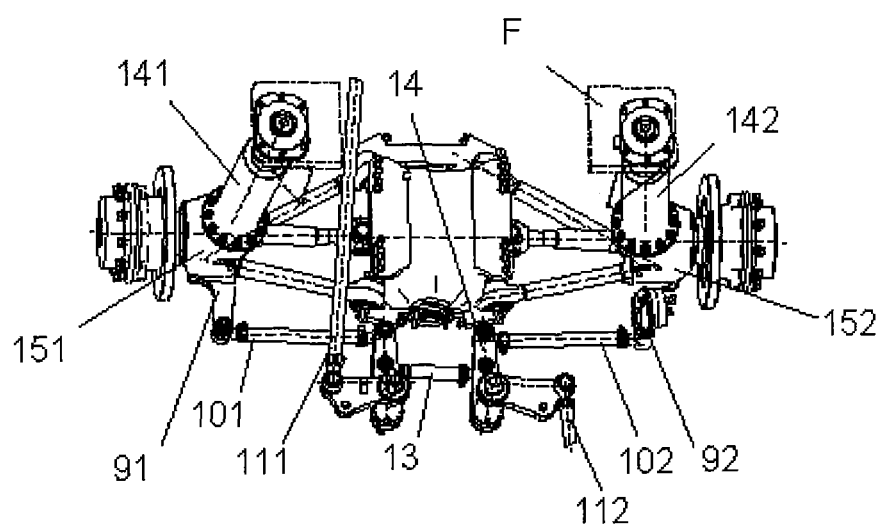
FIG. 6 is a schematic diagram of a specific embodiment of a steering mechanism of the present application.

As shown in FIG. 4 and FIG. 5, to detachably and rotatably connect the steering arm to the mounting bracket 4, the first rotary connecting part further includes a first shaft housing 1, the second rotary connecting part further includes a second shaft housing 1', and the first shaft housing 1 and the second shaft housing 1' are respectively engaged with the first end and the second end of the pin shaft to rotatably locate the sleeve on the mounting bracket 4. It can be seen from the figures that, the first shaft housing 1 and the second shaft housing 1' can be detachably connected to the mounting bracket 4 through bolts 3 and gaskets 2 to improve the replaceability of the steering arm.

As shown in FIG. 4 and FIG. 5, in order to match with the shapes of the first rotary connecting part and the second rotary connecting part of the steering arm, the first shaft housing 1 and the second shaft housing 1' are arranged, and a first mounting plate 43 and a second mounting plate 44 corresponding to the first shaft housing 1 and the second shaft housing 1' are arranged on corresponding positions on the mounting bracket 4. A groove 5 engaged with the shape of the rotary connecting part of the steering arm is formed in the mounting plate as shown in FIG. 5, in one embodiment of the rotary connecting part consisting of the pin shaft, the shape of the groove 5 is an arc and is preferably a circular arc. In addition, a screw hole 6 for conveniently fixing the bolt 3 is further provided, so that the bolt 3 is fixed on the mounting plate by passing through a through hole on the shaft housing. Since the grooves 5 are formed in the first mounting plate 43 and the second mounting plate 44 of the mounting bracket 4, when the steering arm is assembled, only a lateral thrust is slightly applied to the steering arm to push it into the grooves 5 of the first mounting plate 43 and the second mounting plate 44, and then the steering arm can be mounted on the mounting bracket 4 by the first shaft housing 1 and the second shaft housing 1', the gaskets 2 and the bolts 3. Compared with the manner of welding the steering arm on the bracket or the manner of firstly inserting the steering arm into the two mounting holes in the bracket and then fastening the steering arm by the bolts in the prior art, the structure in the embodiment of the present application is easier to assemble, which is conducive to improving the assembly efficiency, and the structure is firmer.

The present application further discloses a steering mechanism, including the aforementioned steering arm assembly.

Specifically, the steering mechanism includes two groups of steering arm assemblies, namely, a first steering arm assembly and a second steering arm assembly; the first steering arm assembly and the second steering arm assembly are rotatably located on the mounting bracket 4.

The steering mechanism further includes a first hydropneumatic suspension cylinder 141 and a second hydropneumatic suspension cylinder 142, wherein an upper hinge point of the first hydro-pneumatic suspension cylinder 141 is hinged with the mounting bracket 4, and a lower hinge point of the first hydro-pneumatic suspension cylinder 141 is fixedly connected with a first steering knuckle 151; an upper hinge point of the second hydro-pneumatic suspension cylinder 142 is hinged with the mounting bracket 4, and a lower hinge point of the second hydro-pneumatic suspension cylinder 142 is fixedly connected with a second steering knuckle 152.

The first steering knuckle 151 and the second steering knuckle 152 are respectively connected with the first steering arm assembly and the second steering arm assembly.

In addition, the first steering knuckle 151 is provided with a first trapezoidal arm 91; and the second steering knuckle 152 is provided with a second trapezoidal arm 92; the first trapezoidal arm 91 is connected with a lower rocker arm of the first steering arm assembly through a first trapezoidal track rod 101; the second trapezoidal arm 92 is connected with the lower rocker arm of the second steering arm assembly through a second trapezoidal track rod 102; and the lower rocker arm of the first steering arm assembly is connected with the lower rocker arm of the second steering arm assembly through an intermediate transition rod 13. An upper rocker arm of the first steering arm assembly is connected with a first steering link assembly 111; and the upper rocker arm of the second steering arm assembly is connected with a second steering link assembly 112.

The present application further discloses a specific embodiment of a multi-axle steering wheel type heavy duty vehicle, including the aforementioned steering mechanism.

The foregoing descriptions are merely specific embodiments of the present application, it should be noted that those of ordinary skill in the art can still make a variety of improvements and modifications without departing from the principle of the present application, and these improvements and modifications should prevail over the protection scope of the present application.

The invention claimed is:

1. A steering mechanism comprising a steering arm assembly, the steering arm assembly comprising a steering arm body, a first rotary connecting part and a second rotary connecting part,
wherein a first end and a second end of the steering arm body are fixedly connected with a first rocker arm and a second rocker arm respectively;
the first rotary connecting part and the second rotary connecting part are respectively connected with the first end and the second end of the steering arm body, and the steering arm body is rotatable relative to the first rotary connecting part and the second rotary connecting part;
the steering arm body is detachably located on a mounting bracket through the first rotary connecting part and the second rotary connecting part; and
the first rotary connecting part comprises a first shaft housing, and the second rotary connecting part comprises a second shaft housing; the mounting bracket comprises a first mounting plate and a second mounting plate corresponding to the first shaft housing and the second shaft housing respectively; and the first shaft housing and the second shaft housing are respectively engaged with the first mounting plate and the second mounting plate to rotatably locate the steering arm body on the mounting bracket;
wherein the steering arm assembly comprises a first steering arm assembly and a second steering arm assembly, and the steering, mechanism further comprises a first hydro-pneumatic suspension cylinder, a second hydro-pneumatic suspension cylinder, the first steering, knuckle and the second steering knuckle;
wherein the first steering arm assembly and the second steering arm assembly are rotatably located on the mounting bracket;
an upper hinge point of the first hydro-pneumatic suspension cylinder is hinged with the mounting bracket, and a lower hinge point of the first hydro-pneumatic suspension cylinder is fixedly connected with the first steering knuckle; an upper hinge point of the second hydro pneumatic suspension cylinder is hinged with the mounting bracket and a lower hinge point of the second hydro-pneumatic suspension cylinder is fixedly connected with the second steering knuckle; and
the first steering knuckle and the second steering knuckle are respectively connected with the first steering arm assembly and the second steering arm assembly.

2. The steering mechanism of claim 1, wherein the first steering knuckle is provided with a first trapezoidal arm, and the second steering knuckle is provided with a second trapezoidal arm; the first trapezoidal arm is connected with a lower rocker arm of the first steering arm assembly through a first trapezoidal track rod; the second trapezoidal arm is connected with the lower rocker arm of the second steering arm assembly through, a second trapezoidal track rod; and the lower rocker arm of the first steering Urn assembly is connected with the lower rocker arm of the second steering arm assembly through an intermediate transition rod.

3. The steering mechanism of claim 2, wherein an upper rocker arm of the first steering arm assembly is connected with a first steering link assembly; and the upper rocker arm of the second steering arm assembly is connected with a second steering link assembly.

4. A multi-axle steering wheel type heavy duty vehicle, comprising the steering mechanism of claim 1.

5. The steering mechanism of claim 1, wherein the first rotary connecting part comprises a first cylinder and a first bearing, and an inner ring of the first bearing is sleeved and fixed on the first cylinder; the second rotary connecting part comprises a second cylinder and a second bearing, and an inner ring of the second bearing is sleeved and fixed on the second cylinder.

6. The steering mechanism of claim 5, wherein the steering arm body comprises a sleeve, and a pin shaft whose length is larger than that of the sleeve is sleeved in the sleeve; a first end of the pin shaft forms the first cylinder, and a second end of the pin shaft forms the second cylinder; the inner ring, of the first bearing is fixedly connected with the first end of the pin shaft, and an outer ring of the first bearing is fixedly connected with the inner wall of the first end of the sleeve; and the inner ring of the second bearing is fixedly connected with the second end of the pin shaft, and an outer ring of the second bearing is fixedly connected with the inner wall of the second end of the sleeve.

7. The steering mechanism of claim 6, wherein a first step structure is formed on the first end of the sleeve; a second step structure is formed on the inner wall of the second end of the sleeve; the outer ring of the first bearing is located on the first step structure; and the outer ring of the second bearing is located on the second step structure.

8. The steering mechanism of claim 7, further comprising a first bearing retainer ring and a second bearing retainer ring, wherein the first bearing retainer ring and the second bearing retainer ring are respectively located on the first end and the second end of the sleeve for closing the first bearing and the second bearing in the first end and the second end.

9. The steering mechanism of claim 8, wherein the first bearing retainer ring is provided with a first boss structure, and when the first bearing retainer ring is located on the first end, the first boss structure abuts against the inner ring of the first bearing; and the second bearing retainer ring is provided with a second boss structure, and when the second bearing retainer ring is located on the second end, the second boss structure abuts against the inner ring of the second bearing.

10. The steering mechanism of claim 9, further comprising a first round nut, a first check washer and a first sealing pad, wherein the first round nut locates the first bearing retainer ring on the first end of the sleeve through the first check washer, and the first sealing pad isolates the first bearing from the external environment; and the steering arm assembly comprises a second round nut, a second check washer and a second sealing pad, the second round nut locates the second bearing retainer ring on the second end of the sleeve through the second check washer, and the second sealing pad isolates the second bearing from the external environment.

* * * * *

UNITED STATES PATENT AND TRADEMARK OFFICE
CERTIFICATE OF CORRECTION

PATENT NO. : 10,583,860 B2
APPLICATION NO. : 15/540742
DATED : March 10, 2020
INVENTOR(S) : Shan et al.

Page 1 of 1

It is certified that error appears in the above-identified patent and that said Letters Patent is hereby corrected as shown below:

On the Title Page

Item (30) Foreign Application Priority Data:
Please correct "2014 1 0841064" to read -- 2014 1 0841064.4 --

In the Claims

Column 8, Line 1, Claim 1:
Please correct "steering, mechanism" to read -- steering mechanism --

Column 8, Line 4, Claim 1:
Please correct "steering, knuckle" to read -- steering knuckle --

Column 8, Line 14, Claim 1:
Please correct "hydro pneumatic" to read -- hydro-pneumatic --

Column 8, Line 15, Claim 1:
Please correct "bracket and" to read -- bracket, and --

Column 8, Line 28, Claim 2:
Please correct "through, a" to read -- through a --

Column 8, Line 29, Claim 2:
Please correct "Urn" to read -- arm --

Column 8, Line 51, Claim 6:
Please correct "ring, of" to read -- ring of --

Signed and Sealed this
First Day of September, 2020

Andrei Iancu
*Director of the United States Patent and Trademark Office*